US009596164B1

(12) United States Patent
Kumar et al.

(10) Patent No.: US 9,596,164 B1
(45) Date of Patent: Mar. 14, 2017

(54) APPLICATION VISIBILITY IN LAYER 3 NETWORKS

(71) Applicant: Juniper Networks, Inc., Sunnyvale, CA (US)

(72) Inventors: Jainendra Kumar, Fremont, CA (US); Raghu Ram Reddy Mavillapally, Sunnyvale, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 308 days.

(21) Appl. No.: 14/316,202

(22) Filed: Jun. 26, 2014

(51) Int. Cl.
  *G06F 15/16* (2006.01)
  *H04L 12/26* (2006.01)

(52) U.S. Cl.
  CPC .................................. *H04L 43/12* (2013.01)

(58) Field of Classification Search
  CPC ............................... H04L 43/12; G06F 15/173
  USPC .................................................. 709/220–229
  See application file for complete search history.

(56) References Cited

U.S. PATENT DOCUMENTS

| | | | | |
|---|---|---|---|---|
| 5,878,420 A * | 3/1999 | de la Salle | ............... | H04L 41/26 |
| 6,801,940 B1 * | 10/2004 | Moran | ..................... | H04L 47/10 370/230 |
| 6,880,089 B1 * | 4/2005 | Bommareddy | ... | H04L 29/12367 709/200 |
| 7,043,549 B2 * | 5/2006 | Breese | ................ | G06F 11/3495 709/224 |
| 7,047,291 B2 * | 5/2006 | Breese | ................ | H04L 41/0631 709/223 |
| 7,143,159 B1 * | 11/2006 | Grace | ................. | H04L 41/0213 709/201 |
| 7,453,886 B1 * | 11/2008 | Allan | ................... | H04L 41/0866 370/395.5 |
| 7,823,155 B2 * | 10/2010 | Misra | ...................... | H04L 43/12 370/252 |
| 7,987,257 B1 * | 7/2011 | Stewart | ............... | H04L 41/5003 709/223 |
| 8,495,193 B2 * | 7/2013 | Kuzhiyil | ............... | G06F 9/5038 709/223 |

(Continued)

OTHER PUBLICATIONS

Wikipedia, "Network Management", http://en.wikipedia.org/wiki/Network_management, Jun. 1, 2014, 3 pages.

*Primary Examiner* — Moustafa M Meky
*Assistant Examiner* — Thorne E Waugh
(74) *Attorney, Agent, or Firm* — Harrity & Harrity, LLP

(57) ABSTRACT

A device may receive configuration information for generating an application probe. The application probe may be used to request network information, associated with an application, from network devices. The device may determine, based on the configuration information, traffic parameters associated with the application. The device may determine a requested type of network information to be requested from the network devices. The device may generate the application probe by including, in the application probe, the traffic parameters and information identifying the requested type of network information. The device may transmit the application probe to a network device of the network devices. The device may receive, from the network device and based on transmitting the application probe, a value associated with the requested type of network information.

20 Claims, 9 Drawing Sheets

(56) References Cited

U.S. PATENT DOCUMENTS

| | | | | |
|---|---|---|---|---|
| 8,683,466 B2* | 3/2014 | Raj Seeniraj | ............. | G06F 8/38 |
| | | | | 718/1 |
| 9,069,890 B2* | 6/2015 | Kaiser | ................. | G06F 11/3442 |
| 9,100,242 B2* | 8/2015 | Nambiar | ................. | H04L 47/28 |
| 9,225,554 B2* | 12/2015 | Gotesdyner | ......... | H04L 12/6418 |
| 9,332,458 B2* | 5/2016 | Nuss | .................... | H04W 28/08 |
| 9,344,344 B2* | 5/2016 | Bucci | ..................... | H04L 43/12 |
| 2004/0064552 A1* | 4/2004 | Chong | ................ | G06F 11/3006 |
| | | | | 709/224 |
| 2007/0171827 A1* | 7/2007 | Scott | .................... | H04L 43/026 |
| | | | | 370/235 |
| 2012/0167081 A1* | 6/2012 | Sedayao | ................ | G06F 11/30 |
| | | | | 718/1 |
| 2013/0262655 A1* | 10/2013 | Deschênes | .............. | H04L 43/12 |
| | | | | 709/224 |
| 2015/0063158 A1* | 3/2015 | Nedeltchev | ........... | H04W 76/00 |
| | | | | 370/253 |

* cited by examiner

US 9,596,164 B1

APPLICATION VISIBILITY IN LAYER 3 NETWORKS

BACKGROUND

In computer networks, network management refers to the activities, methods, procedures, and tools that pertain to the operation, administration, maintenance, and provisioning of networked systems. Network management may be used to control a manner in which network traffic is processed by network devices included in a network.

SUMMARY

According to some possible implementations, a device may receive configuration information for generating an application probe. The application probe may be used to request network information, associated with an application, from network devices. The device may determine, based on the configuration information, traffic parameters associated with the application. The device may determine a requested type of network information to be requested from the network devices. The device may generate the application probe by including, in the application probe, the traffic parameters and information identifying the requested type of network information. The device may transmit the application probe to a network device of the network devices. The device may receive, from the network device and based on transmitting the application probe, a value associated with the requested type of network information.

According to some possible implementations, a computer-readable medium may store instructions that, when executed by a processor, cause the processor to receive configuration information for generating an application probe. The application probe may be used to request network information, associated with an application, from network devices. The instructions may cause the processor to determine, based on the configuration information, traffic parameters that identify a traffic flow associated with the application. The instructions may cause the processor to determine a type of network information to be requested from the network devices. The type of network information may be associated with processing of the application probe by the network devices. The instructions may cause the processor to generate the application probe. The application probe may include the traffic parameters and information identifying the type of network information. The instructions may cause the processor to transmit the application probe to a network device of the network devices. The instructions may cause the processor to receive, from the network device and based on transmitting the application probe, a value corresponding to the type of network information. The instructions may cause the processor to store the value corresponding to the type of network information.

According to some possible implementations, a method may include receiving, by a probing device, configuration information for generating application probes. The application probes may be used to request network information, associated with an application, from network devices. The method may include determining, by the probing device and based on the configuration information, a traffic parameter associated with the application. The method may include determining, by the probing device, a network information type to be requested from the network devices. The method may include generating, by the probing device, the application probes. The application probes may identify the traffic parameter and the network information type. The method may include transmitting, by the probing device, a first application probe, of the application probes, to a first network device of the network devices. The method may include transmitting, by the probing device, a second application probe, of the application probes, to a second network device of the network devices. The method may include receiving, by the probing device and from the first network device, a first value associated with the network information type. The method may include receiving, by the probing device and from the second network device, a second value associated with the network information type. The method may include storing, by the probing device, the first value and the second value.

DETAILED DESCRIPTION

The following detailed description of example implementations refers to the accompanying drawings. The same reference numbers in different drawings may identify the same or similar elements.

An application provider that provides an application (e.g., a software application, a web application, etc.) may want to monitor attributes of network traffic, associated with the application, as the network traffic is communicated over a network. However, when the network traffic is communicated over the network (e.g., a layer 3 network), information that links the application to the network traffic may be lost. This may make it difficult to link attributes of the network traffic to the application. Implementations described herein assist in monitoring attributes of network traffic associated with an application (e.g., so that an application provider may improve performance of the application).

Figure 1:
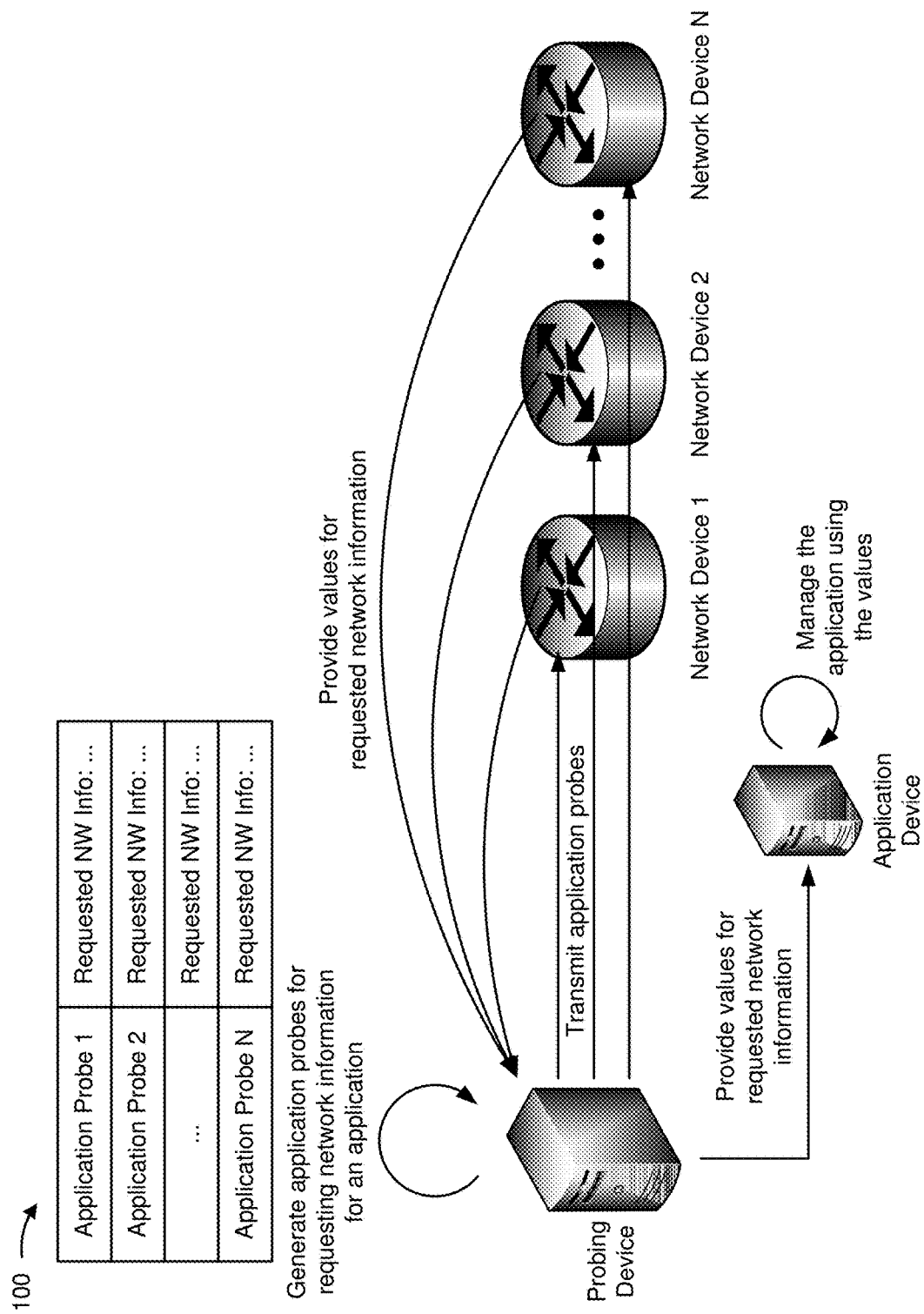
FIG. 1 is a diagram of an overview of an example implementation described herein.

FIG. 1 is a diagram of an overview of an example implementation 100 described herein. As shown in FIG. 1, a probing device (e.g., a server, a gateway, a switch, etc.) may generate application probes for requesting network information associated with an application. An application probe may simulate behavior of an application packet that carries application information. An application probe may further indicate network information that the probing device is requesting from network devices that receive the application probe.

As further shown in FIG. 1, the probing device may transmit the application probes via a network, and network devices (e.g., routers, switches, gateways, etc.), included in the network, may receive the application probes. An application probe may store information that indicates a lifetime of the application probe, and when the lifetime expires, a particular network device that detects expiration of the application probe may read the requested network information, may determine a value associated with the requested network information (e.g., a value of the network information for the particular network device), and may provide the value back to the probing device. The probing device may provide values, received from multiple network devices, to an application device (e.g., a web server, a user device, etc.), and the application device may use the values to manage the application. In this way, an application provider may receive accurate network information for network traffic associated with an application, and may use the network information to modify performance of the application.

Figure 2:
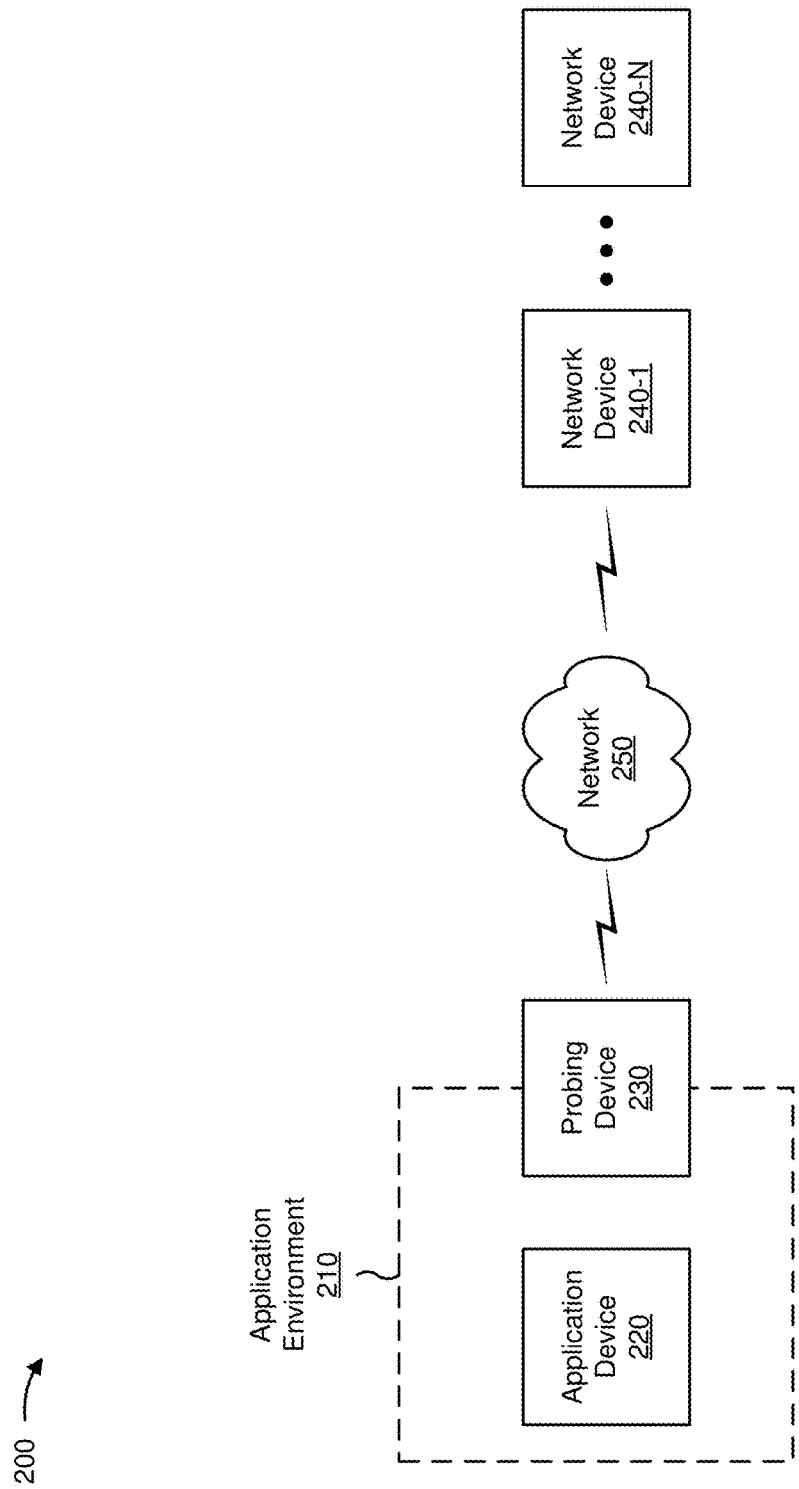
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include an application environment 210, which may include an application device 220. As further shown in FIG. 2, environment 200 may include a probing device 230, a set of network devices 240-1 through 240-N(N≥1) (hereinafter referred to collectively as "network devices 240," and individually as "network device 240"), and a network 250. Devices of environment 200 may interconnect via wired connections, wireless connections, or a combination of wired and wireless connections.

Application environment 210 may include an environment associated with an application (e.g., a software application, a web application, etc.). Application environment 210 may include one or more hardware devices (e.g., application device 220) that assist in providing and/or managing the application. As an example, application environment 210 may include a data center, a cloud computing environment, a server farm, a server cluster, a private network, etc.

Application device 220 may include one or more devices capable of requesting, receiving, generating, storing, processing, and/or providing network information associated with an application. In some implementations, application device 220 may include a device associated with providing and/or managing an application (e.g., and/or may be located within application environment 210). For example, application device 220 may include a server device (e.g., a web server, an orchestration server, a management server, etc.) or a similar type of device. Additionally, or alternatively, application device 220 may include a device associated with receiving a service provided by an application (e.g., and/or may not be located within application environment 210). For example, application device 220 may include a desktop computer, a laptop computer, a mobile phone (e.g., a smart phone), or the like.

Probing device 230 may include one or more devices capable of generating, storing, processing, and/or transmitting application probes and/or information associated with application probes. For example, probing device 230 may include a server device (e.g., a proxy server, a monitoring server, etc.), a router, a switch, a gateway, a hub, a bridge, a security device (e.g., an intrusion detection device, a firewall, etc.), a load balancing device, or the like. In some implementations, probing device 230 may generate and transmit, to network device(s) 240, application probes for monitoring network traffic associated with an application, and may receive values, for the requested network information, from network device(s) 240.

In some implementations, probing device 230 may be located internal to application environment 210. In some implementations, probing device 230 may be located external to application environment 210 (e.g., within a particular quantity of hops). In some implementations, probing device 230 may be located on a border between application environment 210 and an external network (e.g., network 250).

Network device 240 may include one or more devices (e.g., one or more traffic transfer devices) capable of processing and/or transferring traffic between endpoint devices (e.g., application device 220 that provides an application and a user device that receives a service provided by the application). For example, network device 240 may include a router, a gateway, a switch, a hub, a bridge, a reverse proxy, a firewall, a server (e.g., a proxy server), a security device, an intrusion detection device, a load balancer, or a similar type of device. Network device 240 may receive an application probe from probing device 230 (and/or via one or more other network devices 240), may determine network information requested via the application probe, and may provide the requested network information to probing device 230.

Network 250 may include one or more wired and/or wireless networks. For example, network 250 may include a cellular network, a public land mobile network (PLMN), a wireless local area network (e.g., a Wi-Fi network), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or a combination of these or another type of network.

The number and arrangement of devices and networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
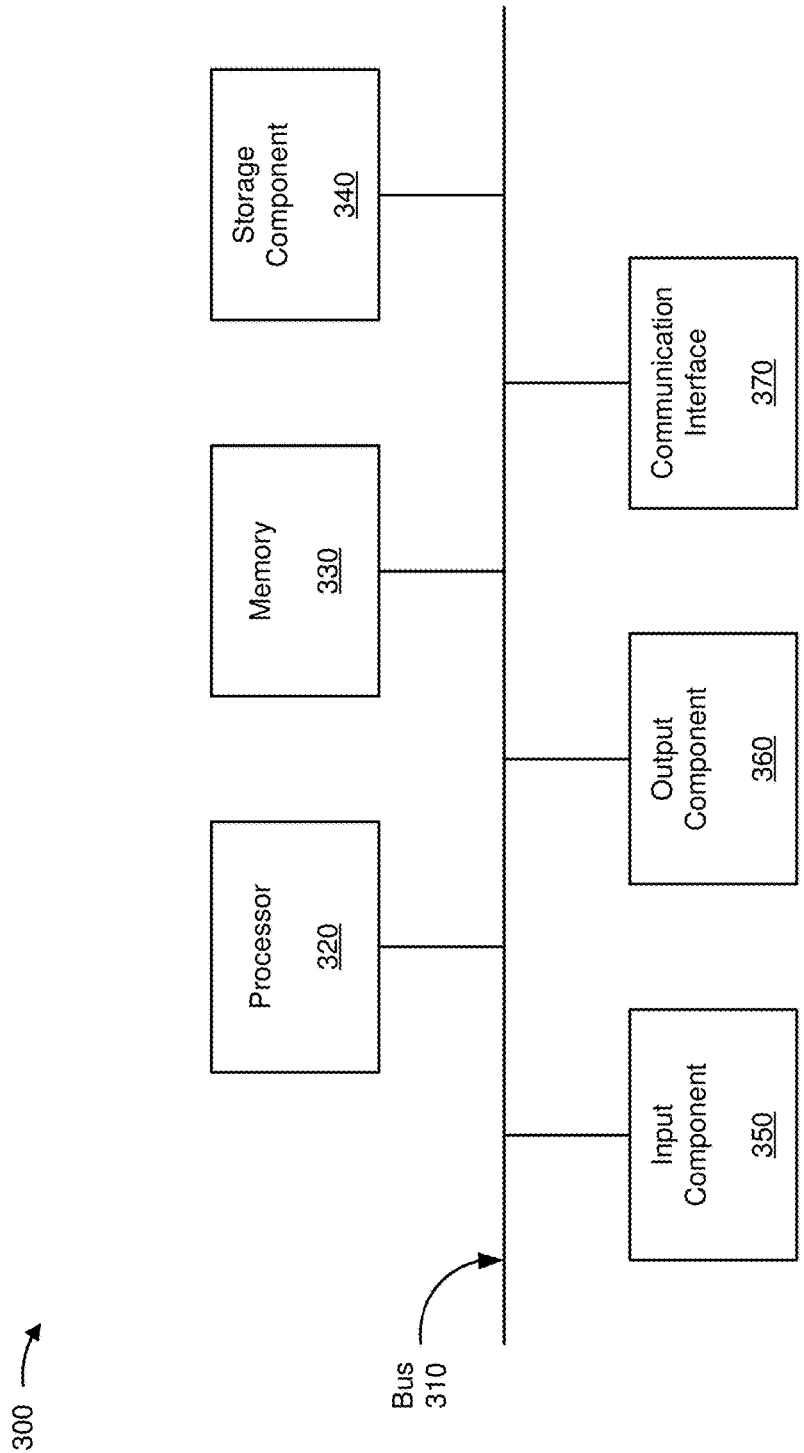
FIG. 3 is a diagram of example components of one or more devices of FIG. 2.

FIG. 3 is a diagram of example components of a device 300. Device 300 may correspond to application device 220, probing device 230, and/or network device 240. In some implementations, application device 220, probing device 230, and/or network device 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 is provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
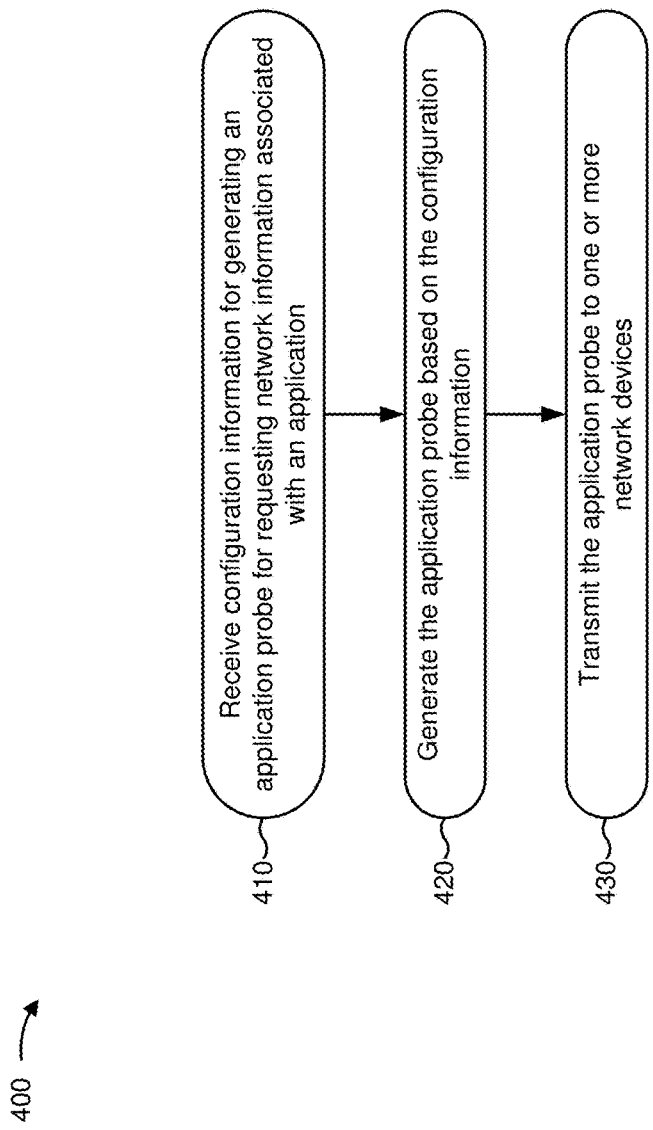
FIG. 4 is a flow chart of an example process for generating application probes for requesting network information associated with an application.

FIG. 4 is a flow chart of an example process 400 for generating application probes for requesting network information associated with an application. In some implementations, one or more process blocks of FIG. 4 may be performed by probing device 230. In some implementations, one or more process blocks of FIG. 4 may be performed by another device or a group of devices separate from or including probing device 230, such as application device 220 and/or network device 240.

As shown in FIG. 4, process 400 may include receiving configuration information for generating an application probe for requesting network information associated with an application (block 410). For example, probing device 230 may receive configuration information (e.g., via user input and/or input received from another device). As an example, a user may interact with an input device (e.g., a desktop computer, a laptop computer, etc.) to provide configuration information to probing device 230. In some implementations, probing device 230 may receive the configuration information via an application programming interface (API) that specifies configuration information and/or a format for configuration information to be provided to probing device 230. Probing device 230 may use the configuration information to generate one or more application probes for requesting network information associated with an application (e.g., a software application, a web application, an application associated with a provided service, etc.).

The configuration information may include, for example, an application identifier that includes one or more traffic parameters for identifying the application as being associated with a packet. For example, an application identifier may include a source network address (e.g., a media access control (MAC) address, an internet protocol (IP) address, a device identifier, etc.) associated with the application (e.g., a source network address that identifies a device that provides the application, such as application device 220), a destination network address associated with the application (e.g., that identifies a destination device to receive application information), a port identifier associated with the application (e.g., a source port identifier, a destination port identifier, etc.), a protocol identifier associated with the application (e.g., information that identifies a protocol via which application information is transmitted, such as transport control protocol (TCP), user datagram protocol (UDP), SIGTRAN protocol, a web traffic frame, an encrypted web traffic frame, etc.), or the like. In some implementations, the application identifier may include information that identifies a traffic flow via which application packets are carried. Additionally, or alternatively, the application identifier may include information associated with a tunnel via which application packets are carried (e.g., a tunnel identifier, tunnel endpoint identifiers, a type of tunnel, a protocol for the tunnel, etc.).

Additionally, or alternatively, the configuration information may include monitoring information that identifies a manner in which probing device 230 is to monitor network information associated with the application. For example, the monitoring information may indicate a start time for monitoring the network information (e.g., a start time at which application probes are to be transmitted to network devices 240), an end time for monitoring the network information (e.g., an end time at which probing device 230 is to stop transmitting application probes), a time period during which probing device 230 is to monitor the network information, a quantity of network devices 240 from which to request network information (e.g., a quantity of hops to which application probes are to be sent), etc.

The configuration information may identify a type of network information to be requested from network devices 240, in some implementations. Network information may include information associated with network traffic being processed by network device 240. Additionally, or alternatively, network information may include information associated with processing the application probe (e.g., by network device 240). For example, network information may include a measure of bandwidth utilization of network device 240 (e.g., an average bandwidth utilization for all network traffic, a bandwidth utilization on a particular interface via which the application probe is input and/or output, etc.), a measure of central processing unit (CPU) utilization of network device 240, a quantity of network traffic being processed by network device 240, a measure of latency associated with network traffic and/or an application probe processed by network device 240 (e.g., an average latency, a maximum latency, a minimum latency, a switching latency, etc.), a measure of jitter associated with the network traffic, a packet drop rate associated with the network traffic and/or the application probe, a queue utilization of network device 240, information that identifies a path for the network traffic and/or the application probe (e.g., a path through one or more network devices 240, such as an equal-cost multipath (ECMP) routing path), load balancing information (e.g., an ECMP bucket utilization for detecting fair load balancing), a click synchronization protocol used by network device 240 (e.g., a precision time protocol (PTP), etc.), etc.

In some implementations, the configuration information may identify a set (e.g., one or more) of the above types of network information, or other types of network information, to be requested from network devices 240. Additionally, or alternatively, the user may use a group identifier to select a set of network information types, and the group identifier may be provided to probing device 230. Probing device 230 may use the group identifier to identify the set of network information types to be requested. For example, the user may provide an indication to collect information associated with a traffic flow (e.g., application-centric information), information associated with an overlay, such as a tunnel (e.g., application overlay information), etc.

As further shown in FIG. 4, process 400 may include generating the application probe based on the configuration information (block 420). For example, probing device 230 may generate the application probe using the configuration information. The application probe may include a packet that identifies an application (e.g., using an application identifier, application parameters, etc., as described above) and/or that identifies network information to be returned by one or more network devices 240 that receive the application probe.

For example, probing device 230 may include, in a payload of the packet, an application probing header that indicates that network information is to be returned by network device 240, and/or that identifies a type of network information to be returned. In some implementations, probing device 230 may generate the application probe using a protocol specified in the configuration information (e.g., a same protocol as application packets). Additionally, or alternatively, probing device 230 may generate the application probe by encapsulating the payload (e.g., using IP encapsulation and/or application-level encapsulation).

In some implementations, probing device 230 may insert expiration information in the application probe. Network device 240 may use the expiration information to determine whether to provide the requested network information. For example, if the expiration information indicates that the application probe (e.g., a packet) expires upon being received by a particular network device 240, then the particular network device 240 may detect this expiration, and may provide the requested network information. The expiration information may identify an expiration condition that causes the application probe to expire (e.g., a particular amount of time after which the application probe expires, a particular quantity of hops after which the application probe expires, etc.).

In some implementations, the expiration information may include a time-to-live (TTL) indicator. The TTL indicator may indicate a time period for application probe expiration, and/or may indicate a quantity of hops after which the application probe expires. Probing device 230 may generate multiple application probes for a particular application, and different application probes may have different TTL indicators. For example, probing device 230 may generate a first application probe with a TTL indicator of one, indicating that the application probe expires upon reaching a first network device 240 that is one hop away from probing device 230. Similarly, probing device 230 may generate a second application probe with a TTL indicator of two, indicating that the application probe expires upon reaching a second network device 240 that is two hops away from probing device 230. In this way, probing device 230 may gather end-to-end network information from multiple network devices 240.

As further shown in FIG. 4, process 400 may include transmitting the application probe to one or more network devices (block 430). For example, probing device 230 may transmit each generated network probe via a network (e.g., network 250). The application probes may be received by network device(s) 240, which may provide requested network information upon detecting expiration of the application probe, as described in more detail elsewhere herein. In some implementations, probing device 230 may periodically transmit a set of application probes. Additionally, or alternatively, probing device 230 may transmit the set of application probes based on configuration information (e.g., monitoring information that indicates when to transmit application probes, how many application probes to transmit, etc.). In some implementations, probing device 230 may encrypt the application probes.

In this way, probing device 230 may use simulated application packets, in the form of application probes, to collect network information that indicates a manner in which actual application packets (e.g., that carry application information) are processed in a network (e.g., by network devices 240). Thus, probing device 230 may collect network information relating to an application layer (e.g., layer 4) using application probes in a network layer (e.g., layer 3).

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5A:
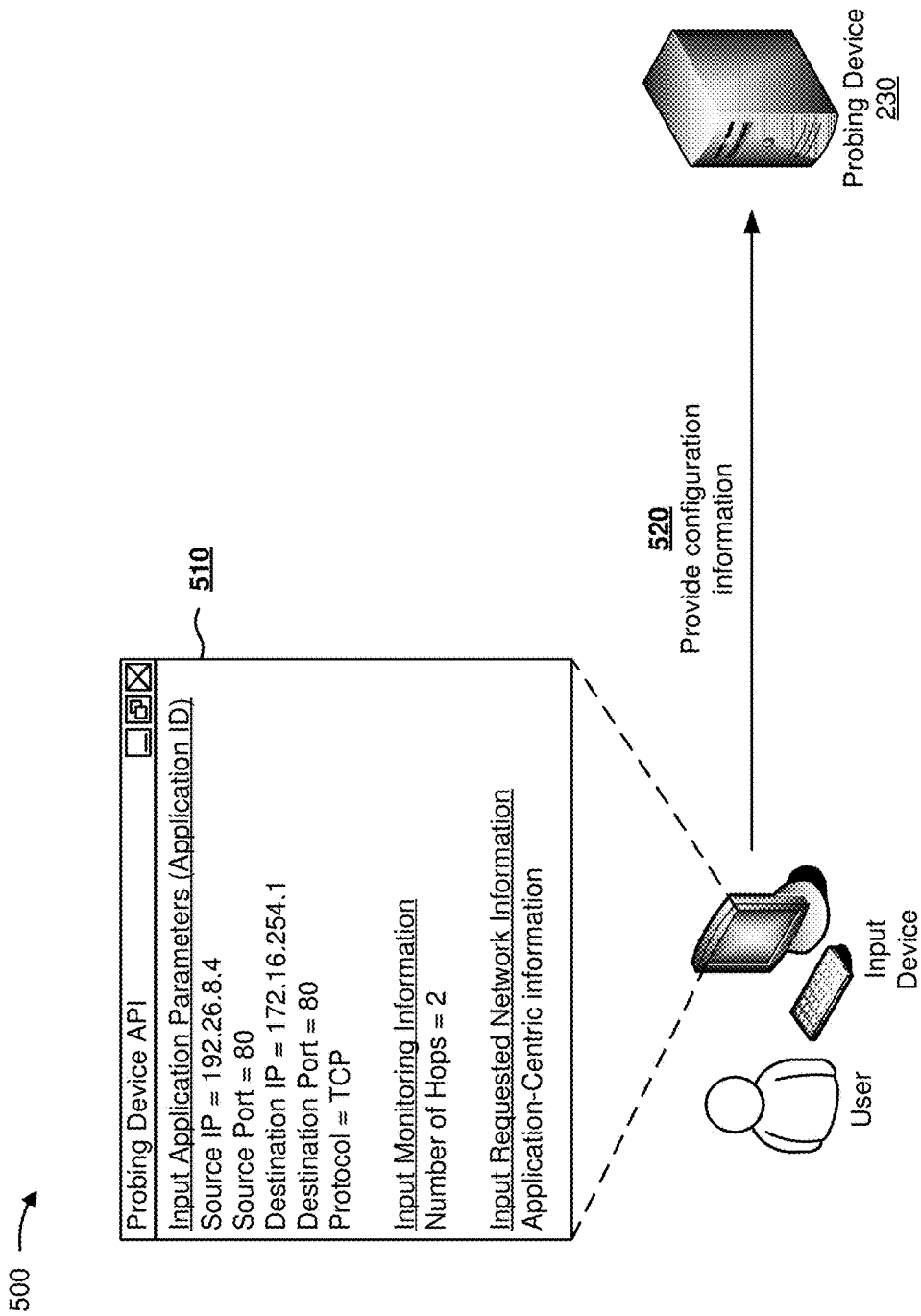
FIGS. 5A and 5B are diagrams of an example implementation relating to the example process shown in FIG. 4.
Figure 5B:
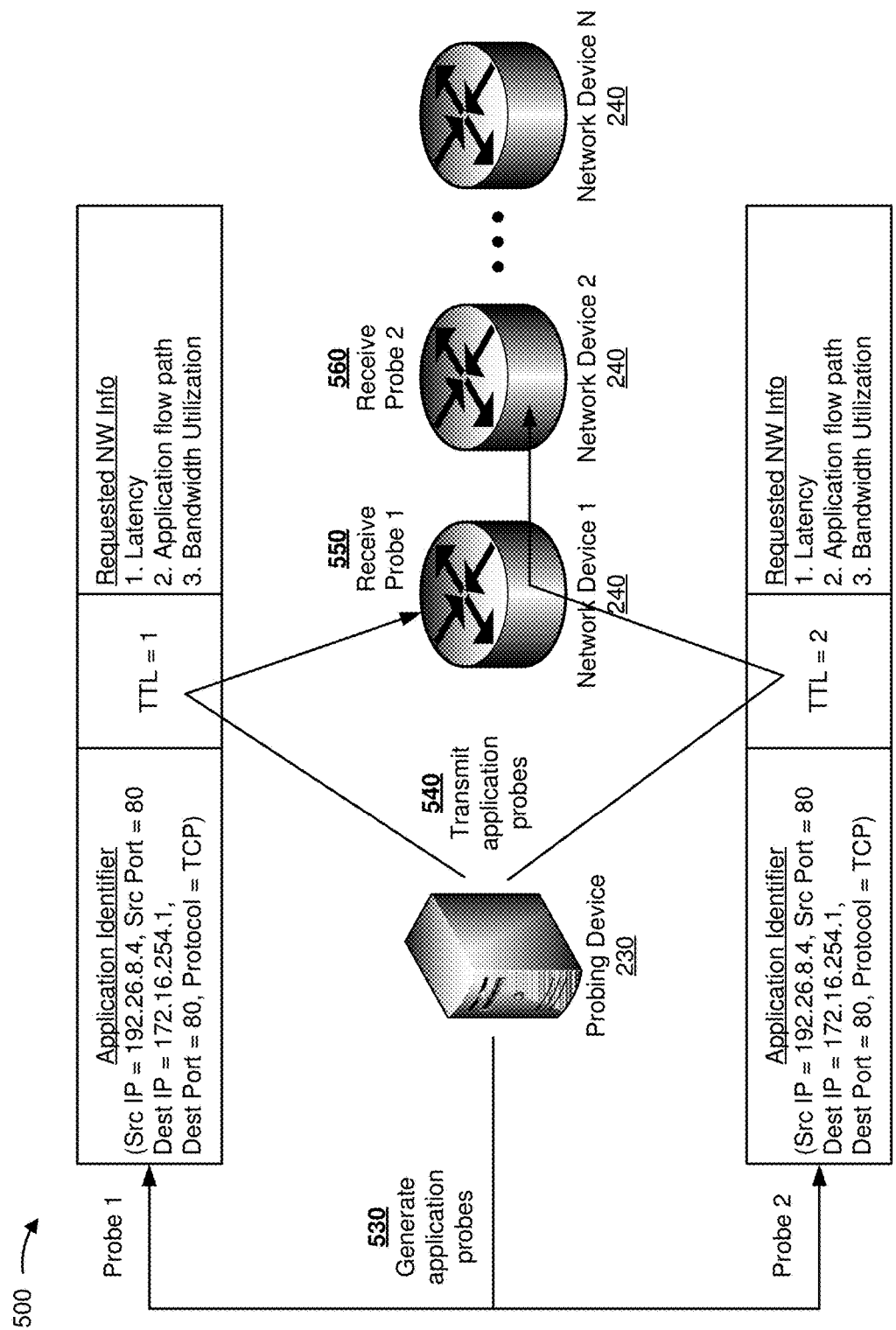

FIGS. 5A and 5B are diagrams of an example implementation 500 relating to example process 400 shown in FIG. 4. FIGS. 5A and 5B show an example of generating application probes for requesting network information associated with an application.

As shown in FIG. 5A, and by reference number 510, assume that a user (e.g., an application administrator) interacts with an input device (e.g., a desktop computer, a laptop computer, etc.) to input configuration information using a probing device API. For example, assume that the user inputs traffic parameters for identifying an application to be monitored. As shown, assume that the application is identified using a source IP address of 192.26.8.4, a source port of 80, a destination IP address of 172.16.254.1, a destination port of 80, and a protocol of TCP. As further shown, assume that network information is to be monitored from 2 hops, and that the requested network information is to include application-centric information (e.g., which may act as a group identifier associated with one or more network information types to be requested from network device 240). As shown by reference number 520, assume that the input device provides the configuration information to probing device 230.

As shown in FIG. 5B, and by reference number 530, assume that probing device 230 generates application probes based on the configuration information. For example, assume that probing device 230 generates two application probes, shown as Probe 1 and Probe 2, to return network information from each of the 2 hops indicated in the configuration information. Further, assume that each application probe includes an application identifier based on the traffic parameters included in the configuration information, includes a different TTL indicator based on the number of hops to be monitored, and includes an application probing header that identifies requested network information types. In this case, assume that application-centric information, to be requested from network devices 240, includes a measure of latency at each hop (e.g., each network device 240), an application flow path at each hop, and a measure of bandwidth utilization at each hop.

As shown by reference number 540, assume that probing device 230 transmits the application probes over a network. As shown by reference number 550, since Probe 1 has a TTL indicator of one (e.g., will expire at the first hop reached), a first network device 240, shown as Network Device 1, may receive Probe 1 and send the requested network information back to probing device 230, as described in more detail elsewhere herein. As shown by reference number 560, since Probe 2 has a TTL indicator of two (e.g., will expire at the second hop reached), Network Device 1 may transmit Probe 2 to a second network device 240, shown as Network Device 2. Network device 2 may receive Probe 2, and may send the requested network information back to probing device 230, as described in more detail elsewhere herein.

Since the application probes include an application identifier for the application to be monitored (e.g., since an application probe simulates an application packet), network devices 240 may process the application probes as if the application probes were actual application packets that carry application information. In this way, probing device 230 may gather network information that indicates a manner in which actual application packets are processed in a network (e.g., a layer 3 network).

As indicated above, FIGS. 5A and 5B are provided merely as an example. Other examples are possible and may differ from what was described with regard to FIGS. 5A and 5B.

Figure 6:
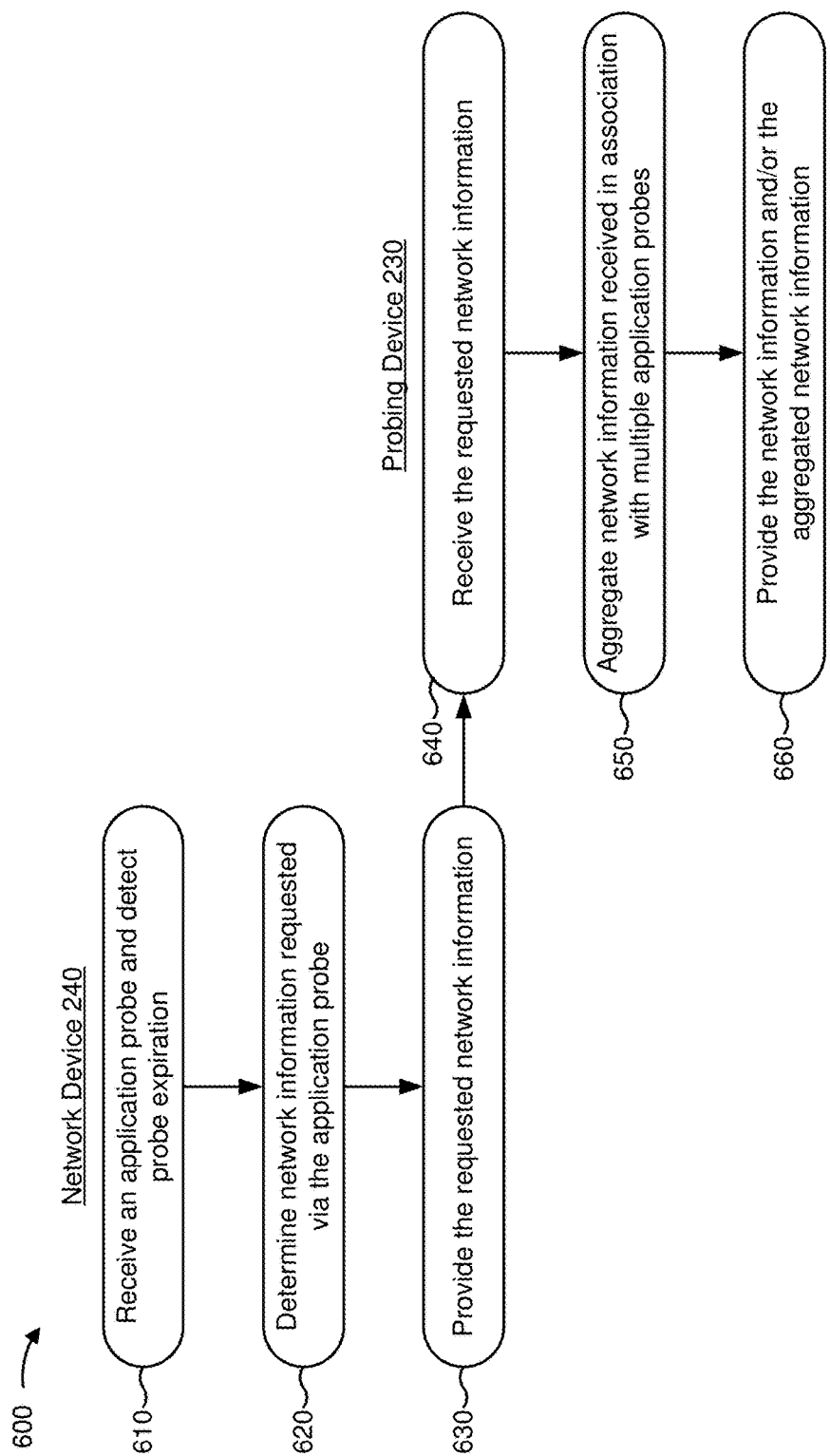
FIG. 6 is a flow chart of an example process for gathering network information, associated with an application, using application probes.

FIG. 6 is a flow chart of an example process 600 for gathering network information, associated with an application, using application probes. In some implementations, one or more process blocks of FIG. 6 may be performed by network device 240 and/or probing device 230. In some implementations, one or more process blocks of FIG. 6 may be performed by another device or a group of devices separate from or including network device 240 and/or probing device 230, such as application device 220.

As shown in FIG. 6, process 600 may include receiving an application probe and detecting probe expiration (block 610). For example, network device 240 may receive an application probe (e.g., from probing device 230 and/or from another network device 240). Network device 240 may determine whether the application probe has expired. For example, network device 240 may read expiration information from the application probe to determine whether the application probe has expired. In some implementations, network device 240 may determine whether a TTL indicator indicates application probe expiration. If the TTL indicator indicates application probe expiration, then network device 240 may detect the application probe expiration. If the TTL indicator does not indicate application probe expiration, then network device 240 may reduce the TTL indicator (e.g., by decrementing a TTL counter), and may transmit the application probe to a next network device 240 in a routing path.

As further shown in FIG. 6, process 600 may include determining network information requested via the application probe (block 620). For example, when network device 240 detects application probe expiration, then network device 240 may determine network information requested via the application probe. Network device 240 may read the application probe (e.g., a payload of the application probe) to identify one or more types of network information requested by probing device 230. Network device 240 may determine values for each type of requested network information, and may include the values in a return packet to be provided to probing device 230. In some implementations, network device 240 may retrieve the values (e.g., from a data structure stored locally by network device 240, from a data structure stored remotely from network device 240 but accessible by network device 240, etc.).

As further shown in FIG. 6, process 600 may include providing the requested network information (block 630). For example, network device 240 may insert the requested network information in a return packet, and may transmit the return packet to probing device 230. In some implementations, network device 240 may include the requested network information (e.g., values for the types of requested network information) in a payload of the return packet. Additionally, or alternatively, network device 240 may encapsulate the payload using an Internet Control Message Protocol (ICMP) header that includes, for example, the application identifier (e.g., determined by reading the application probe), a device identifier for network device 240 (e.g., a network address that identifies network device 240 as a source of the requested network information), a device identifier for probing device 230 (e.g., a network address that identifies probing device 230 as a destination for the requested network information), etc. Additionally, or alternatively, network device 240 may encapsulate the ICMP header using an IP header. Additionally, or alternatively, network device 240 may include a TTL indicator in the return packet such that the return packet expires when the return packet arrives at probing device 230.

As further shown in FIG. 6, process 600 may include receiving the requested network information (block 640). For example, probing device 230 may receive the return packet, from network device 240, and may read the requested network information (e.g., the value(s) for the network information type(s)) from the return packet.

As further shown in FIG. 6, process 600 may include aggregating network information received in association with multiple application probes (block 650), and providing the network information and/or the aggregated network information (block 660). For example, probing device 230 may provide the received network information (e.g., the received values) to application device 220. In some implementations, probing device 230 may provide information that identifies an application with which the network information is associated (e.g., based on an application identifier included in the return packet and/or stored by probing device 230). In this case, application device 220 may process and/or aggregate the network information to modify one or more characteristics of the application (e.g., to improve application performance). In some implementations, application device 220 may request network information from probing device 230 using an API. For example, application device 220 may provide an application identifier, and probing device 230 may return network information associated with the application identifier.

Additionally, or alternatively, probing device 230 may aggregate network information associated with multiple application probes, and may provide the aggregated network information to application device 220. For example, probing device 230 may aggregate network information, associated with a particular application, received from multiple network devices 240. Additionally, or alternatively, probing device 230 may perform a calculation using network information received from multiple network devices 240, to determine an end-to-end treatment of application packets. For example, probing device 230 may determine an average value (e.g., an average latency across multiple network devices 240, an average bandwidth utilization, etc.), may determine a maximum value (e.g., a maximum value of a particular type of network information), may determine a minimum value (e.g., a minimum value of a particular type of network information), or the like.

In this way, application device 220 may use the aggregated network information to improve application performance. For example, application device 220 may use the network information to execute (e.g., launch) an application in an intelligent manner, may use the network information to improve performance of an application that is already executing, etc.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7A:
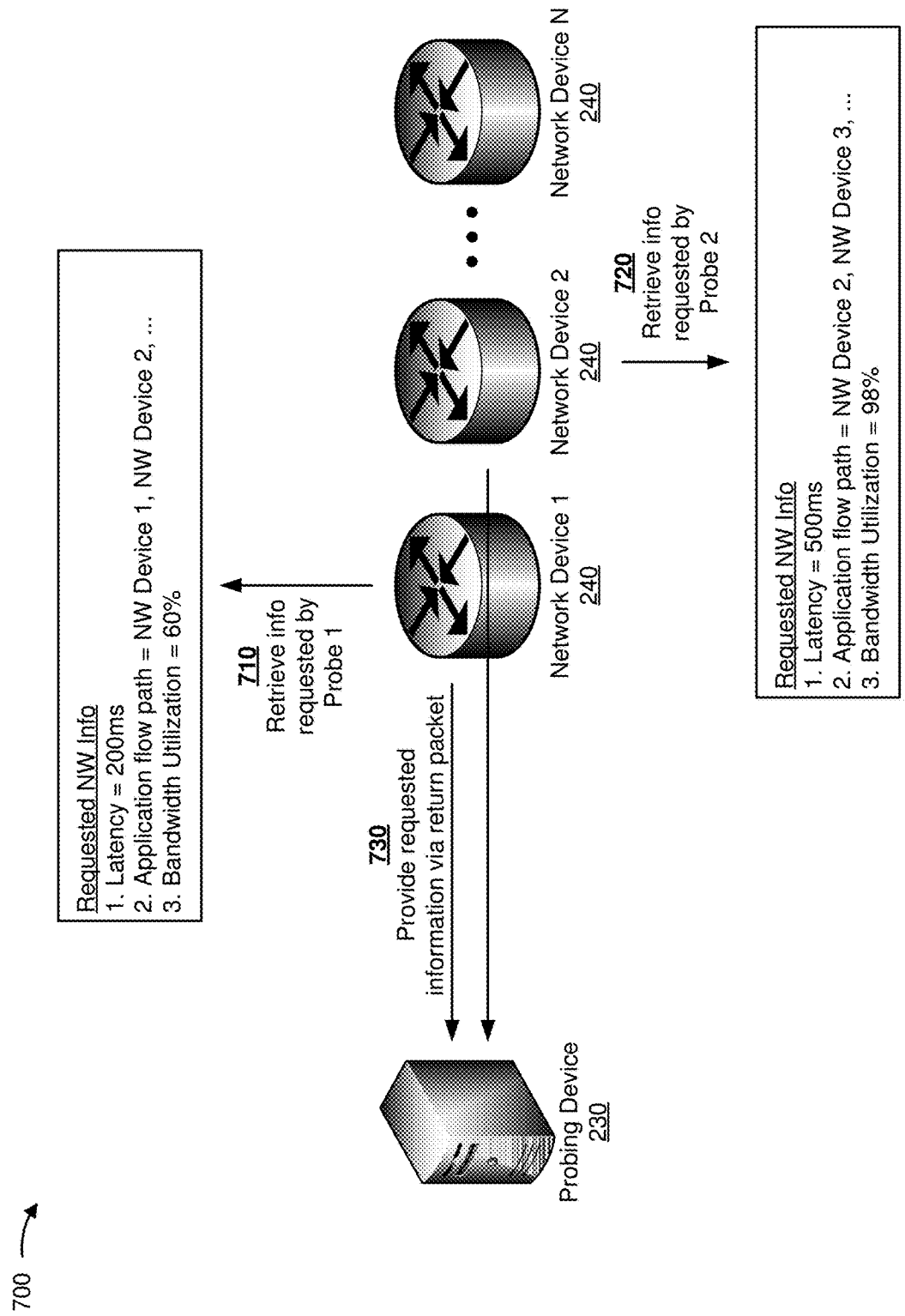
FIGS. 7A and 7B are diagrams of an example implementation relating to the example process shown in FIG. 6.
Figure 7B:
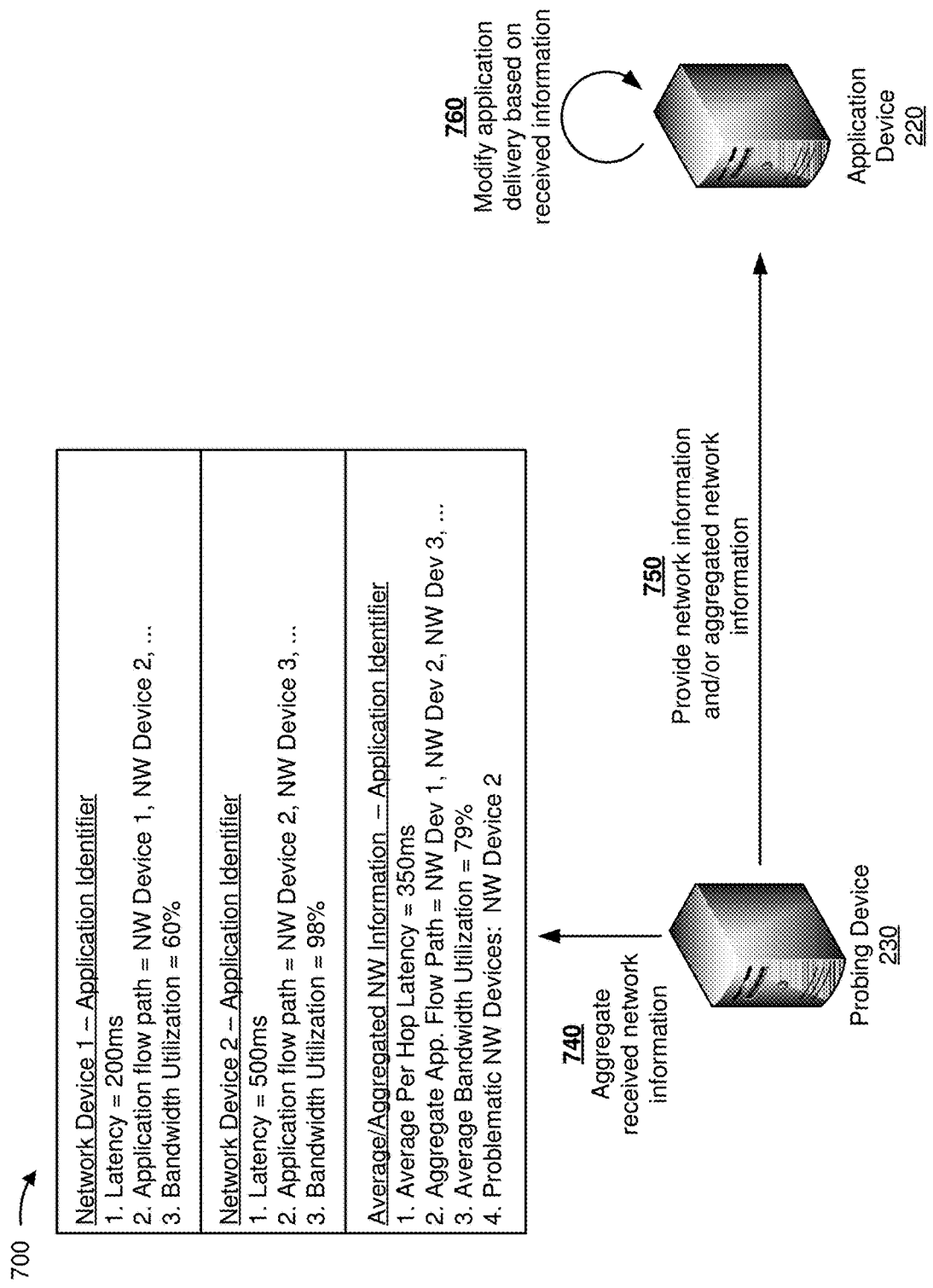

FIGS. 7A and 7B are diagrams of an example implementation 700 relating to example process 600 shown in FIG. 6. FIGS. 7A and 7B show an example of gathering network information, associated with an application, using application probes. For the purpose of FIGS. 7A and 7B, assume that the operations described herein with respect to FIGS. 5A and 5B have been performed.

As shown in FIG. 7A, and by reference number 710, assume that Network Device 1 retrieves (e.g., from a data structure) the information requested by Probe 1. For example, assume that Network Device 1 determines that the Probe 1 is associated with a latency of 200 milliseconds (ms), an application flow path that includes Network Device 1 and Network Device 2, and a bandwidth utilization of 60%. As shown by reference number 720, assume that Network Device 2 retrieves the information requested by Probe 2. For example, assume that Network Device 2 determines that the Probe 2 is associated with a latency of 500 ms, an application flow path that includes Network Device 2 and Network Device 3 (not shown), and a bandwidth utilization of 98%. As shown by reference number 730, assume that Network Device 1 and Network Device 2 each encapsulate this requested network information in return packets, and provide the returns packet to probing device 230.

As shown in FIG. 7B, and by reference number 740, assume that probing device 230 aggregates the received network information. For example, probing device 230 may aggregate the network information by storing a relationship between the application identifier and the network information received from each network device 240 (e.g., Network Device 1 and Network Device 2). As another example, probing device 230 may aggregate the network information by performing one or more calculations, and storing a relationship between the application identifier and a result of the calculation(s). For example, and as shown, assume that probing device 230 determines an average per hop latency (e.g., 350 ms), an aggregate application flow path (e.g., that includes Network Device 1, Network Device 2, and Network Device 3), and an average bandwidth utilization (e.g., 79%). Furthermore, assume that probing device 230 identifies Network Device 2 as a problematic network device 240 (e.g., based on one or more values of requested network information satisfying one or more thresholds).

As shown by reference number 750, assume that probing device 230 provides the network information and/or the aggregated network information to application device 220. As shown by reference number 760, assume that application device 220 modifies delivery of the application based on the received network information. In this way, application device 220 may use network information, relating to a manner in which application packets are processed by network devices 240, to manage an application.

As indicated above, FIGS. 7A and 7B are provided merely as an example. Other examples are possible and may differ from what was described with regard to FIGS. 7A and 7B.

Implementations described herein assist in monitoring attributes of network traffic associated with an application (e.g., so that an application provider may improve performance of the application).

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

As used herein, a packet may refer to a network packet, a frame, a datagram, a segment, a fragment of a packet, a fragment of a frame, a fragment of a datagram, a fragment of a segment, or any other formatted or unformatted unit of data capable of being transmitted via a network.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more processors to:
    receive configuration information for generating an application probe,
        the application probe being used to request network information, associated with an application, from one or more network devices;
    determine, based on the configuration information, one or more traffic parameters associated with the application;
    determine a requested type of network information, associated with a layer 3 network, to be requested from the one or more network devices;
    generate the application probe by including, in the application probe, the one or more traffic parameters and information identifying the requested type of network information;
    transmit the application probe to a network device of the one or more network devices; and
    receive, from the network device and based on transmitting the application probe, a value associated with the requested type of network information.

2. The device of claim 1,
where the one or more processors, when generating the application probe, are to:
    generate a plurality of application probes that include the one or more traffic parameters and the information identifying the requested type of network information,
        the plurality of application probes including the application probe;
    where the one or more processors, when transmitting the application probe, are to:
        transmit the plurality of application probes to a respective plurality of network devices,
            the respective plurality of network devices including the network device; and
    where the one or more processors, when receiving the value, are to:
        receive, from the plurality of network devices and based on transmitting the plurality of application probes, a plurality of values associated with the requested type of network information,
            the plurality of values including the value.

3. The device of claim 1, where the one or more processors are further to:
    receive information that identifies a quantity of network devices from which to request the network information; and
    determine, based on the information that identifies the quantity of network devices, a plurality of network devices from which to request the network information,
        the plurality of network devices including the one or more network devices; and
    where the one or more processors, when transmitting the application probe to the network device, are to:
        transmit a plurality of application probes to the network device,
            the plurality of application probes including the application probe,
                at least one application probe, of the plurality of application probes, causing the network device to forward the at least one application probe to another network device of the plurality of network devices.

4. The device of claim 1,
where the one or more processors are further to:
    determine expiration information to be included in the application probe;
where the one or more processors, when generating the application probe, are to:
    include the expiration information in the application probe; and
where the one or more processors, when transmitting the application probe, are to:
    transmit the application probe, including the expiration information, to the network device,
        the expiration information causing the network device to return the value when the expiration information indicates that the application probe has expired.

5. The device of claim 1,
where the one or more processors are further to:
    determine a quantity of network devices from which to request the network information;
where the one or more processors, when generating the application probe, are to:
    generate a plurality of application probes based on the quantity of network devices,
        the plurality of application probes including the application probe;
    include a different time-to-live indicator in different application probes, of the plurality of application probes, based on the quantity of network devices; and
where the one or more processors, when transmitting the application probe, are to:
    transmit the plurality of application probes to the network device,
        the different time-to-live indicators causing the network device to:
            return the value based on the application probe, and
            forward another application probe, of the plurality of application probes, to another network device of the plurality of network devices.

6. The device of claim 1,
where the one or more processors are to:
    encapsulate, before generating the application probe, the information identifying the requested type of network information with encapsulation information,
        the encapsulation information including information identifying the one or more traffic parameters and information identifying an expiration indicator; and where the one or more processors, when transmitting the application probe, are to:
transmit the application probe, including the encapsulation information, to the network device,
the encapsulation information causing the network device to read the information identifying the requested type of network information when the expiration indicator indicates that the application probe has expired.

7. The device of claim 1, where the one or more processors are further to:
provide the value to an application device associated with managing the application to permit the application device to modify a characteristic of the application.

8. A computer-readable medium storing instructions, the instructions comprising:
one or more instructions that, when executed by one or more processors, cause the one or more processors to:
receive configuration information for generating an application probe,
the application probe being used to request network information,
associated with an application, from one or more network devices;
determine, based on the configuration information, one or more traffic parameters that identify a traffic flow associated with the application;
determine a type of network information, associated with a layer 3 network, to be requested from the one or more network devices,
the type of network information being associated with processing of the application probe by the one or more network devices;
generate the application probe,
the application probe including the one or more traffic parameters and information identifying the type of network information;
transmit the application probe to a network device of the one or more network devices;
receive, from the network device and based on transmitting the application probe, a value corresponding to the type of network information; and
store the value corresponding to the type of network information.

9. The computer-readable medium of claim 8, where the one or more instructions, when executed by the one or more processors, further cause the one or more processors to:
provide the value to an application device associated with managing the application,
the value permitting the application device to perform an action associated with modifying a characteristic of the application.

10. The computer-readable medium of claim 8,
where the one or more instructions, that cause the one or more processors to transmit the application probe, cause the one or more processors to:
transmit a plurality of application probes to the one or more network devices,
the plurality of application probes including the application probe;
where the one or more instructions, that cause the one or more processors to receive the value, cause the one or more processors to:
receive, from the one or more network devices and based on transmitting the plurality of application probes, a plurality of values corresponding to the type of network information,
the plurality of values including the value; and
where the one or more instructions, when executed by the one or more processors, further cause the one or more processors to:
provide the plurality of values to an application device associated with managing the application.

11. The computer-readable medium of claim 8,
where the one or more instructions, that cause the one or more processors to generate the application probe, cause the one or more processors to:
include expiration information in the application probe; and
where the one or more instructions, that cause the one or more processors to transmit the application probe, cause the one or more processors to:
transmit the application probe, including the expiration information, to the network device,
the expiration information causing the network device to:
return the value when the expiration information indicates that the application probe has expired, or
forward the application probe to another network device, of the one or more network devices, when the expiration information indicates that the application probe has not expired.

12. The computer-readable medium of claim 8,
where the application probe is a first application probe;
where the network device is a first network device;
where the value is a first value;
where the one or more instructions, when executed by the one or more processors, further cause the one or more processors to:
determine a first time-to-live indicator that indicates a first expiration condition associated with expiration of the first application probe;
include the first time-to-live indicator in the first application probe;
generate a second application probe;
determine a second time-to-live indicator that indicates a second expiration condition associated with expiration of the second application probe,
the second expiration condition being different than the first expiration condition; and
include the second time-to-live indicator in the second application probe; and
where the one or more instructions, that cause the one or more processors to transmit the application probe, are to:
transmit the first application probe, including the first time-to-live indicator, to the first network device,
the first time-to-live indicator causing the first network device to return the first value; and
transmit the second application probe, including the second time-to-live indicator, to a second network device via the first network device,
the second time-to-live indicator causing the second network device to return a second value corresponding to the type of network information.

13. The computer-readable medium of claim 8, where the application probe causes the network device to treat the application probe as an application packet that carries application information associated with the application.

14. The computer-readable medium of claim 8, where the type of network information includes information associated with processing the application probe by the network device.

15. A method, comprising:
- receiving, by a probing device, configuration information for generating a plurality of application probes,
  - the plurality of application probes being used to request network information, associated with an application and associated with a layer 3 network, from a plurality of network devices;
- determining, by the probing device and based on the configuration information, a traffic parameter associated with the application;
- determining, by the probing device, a network information type to be requested from the plurality of network devices;
- generating, by the probing device, the plurality of application probes,
  - the plurality of application probes identifying the traffic parameter and the network information type;
- transmitting, by the probing device, a first application probe, of the plurality of application probes, to a first network device of the plurality of network devices;
- transmitting, by the probing device, a second application probe, of the plurality of application probes, to a second network device of the plurality of network devices;
- receiving, by the probing device and from the first network device, a first value associated with the network information type;
- receiving, by the probing device and from the second network device, a second value associated with the network information type; and
- storing, by the probing device, the first value and the second value.

16. The method of claim 15, where transmitting the second application probe to the second network device comprises:
- transmitting the second application probe to the second network device via the first network device.

17. The method of claim 15, where receiving the second value from the second network device comprises:
- receive the second value from the second network device via the first network device.

18. The method of claim 15, where generating the first application probe and the second application probe comprises:
- including a first expiration indicator in the first application probe,
  - the first expiration indicator indicating that the first application probe expires when the first application probe is received by the first network device; and
- including a second expiration indicator in the second application probe,
  - the second expiration indicator indicating that the second application probe expires when the second application probe is received by the second network device.

19. The method of claim 18, where transmitting the first application probe and the second application probe comprises:
- transmitting the first application probe, including the first expiration indicator, to the first network device,
  - the first expiration indicator causing the first network device to return the first value to the probing device; and
- transmitting the second application probe, including the second expiration indicator, to the second network device,
  - the second expiration indicator causing the second network device to return the second value to the probing device.

20. The method of claim 18, where transmitting the first application probe and the second application probe comprises:
- transmitting the first application probe, including the first expiration indicator, to the first network device,
  - the first expiration indicator causing the first network device to return the first value to the probing device; and
- transmitting the second application probe, including the second expiration indicator, to the first network device,
  - the second expiration indicator causing the first network device to forward the second application probe to the second network device.

* * * * *